Dec. 19, 1961    G. F. BOGAN    3,013,821
ARTICULATED COUPLING CLAMP
Original Filed June 20, 1956

INVENTOR.
GERALD F. BOGAN
BY Elliott & Pastoriza
ATTORNEYS.

United States Patent Office 3,013,821
Patented Dec. 19, 1961

3,013,821
ARTICULATED COUPLING CLAMP
Gerald F. Bogan, 6318 Muirlands Drive, La Jolla, Calif., assignor of one-half to Emric W. Bergere, Los Angeles County, Calif.
Original application June 20, 1956, Ser. No. 592,542. Divided and this application Sept. 3, 1958, Ser. No. 758,793
2 Claims. (Cl. 285—407)

This invention generally relates to tube coupling improvements, and more particularly concerns an improved coupling clamp for use in conjunction with a detachable joint between two fluid duct lines in which the joint may be subjected to relatively high pressures and unusual temperature conditions.

The present application is a division of applicant's patent application entitled, "Tube Coupling," filed June 20, 1956, and assigned Serial No. 592,542 and now abandoned. In the above-referred to application, applicant disclosed both sealing means and clamping means for use in conjunction with an improved tube coupling. The present divisional application is directed to the invention for the clamping means set forth in the application hereinbefore referred to.

Although detachable fluid couplings are presently available and are satisfactory for most general applications, problems have developed in endeavoring to provide a suitable coupling for high pressure lines or pneumatic duct systems, such as are frequently employed in various aircraft equipments. In this regard, not only must the coupling satisfactorily seal the joint under pressures up to 1000 pounds per square inch, but such sealing action must be effective under adverse temperature conditions as well as unusual vibrations to the line or shock which may result from pulsations of the fluid itself. In addition, it is, of course, necessary that the coupling be of a relatively light weight and be of a design such that it is simple to make and break although it is located in relatively inaccessible or poorly lighted areas.

Couplings which have been developed in recent years to fulfill the above requirements have met with limited success because of the necessity of either structurally complicating the interrelated components or undesirably increasing the initial production cost or subsequent maintenance expense. Thus, with present day couplings available for this type of application, it is usually necessary to replace one or more parts every time the coupling is removed and thereafter remade.

It is, therefore, an object of the present invention to provide a coupling clamp adaptable for high pressure fluid lines, which is easy to make and break under awkward working conditions and yet which will effectively maintain a sealing force under high fluid pressures regardless of unusual temperature variations or vibrations which may develop in the system.

Another object of the present invention is to provide a coupling clamp which is self-aligning, and which is relatively light in weight.

Still another object of the present invention is to provide a coupling clamp which is susceptible of economical manufacture, and which may be easily maintained without frequent replacement of its component parts.

These and other objects and advantages of the present invention are generally attained by providing, in a preferred embodiment, a clamp which is split into two sections so that the clamping force may be more evenly distributed about the entire periphery of the joint. More specifically, each section of the clamp comprises a flat tension band curved in an arc sub-tending an angle slightly less than 180° with the ends of each band being provided with cooperative connecting means. As a primary feature of the present invention, secured to the inner surface of the band are a plurality of V-shaped lugs which are spaced a given angular distance apart. With such a construction, the force applied to the tension band is transmitted through the V lugs at different circumferential points to result in a more effective seal characterized by more equalized force distribution.

A better understanding of the invention will be had by reference to the accompanying drawings illustrating a preferred embodiment only, and in which.

Figure 1:
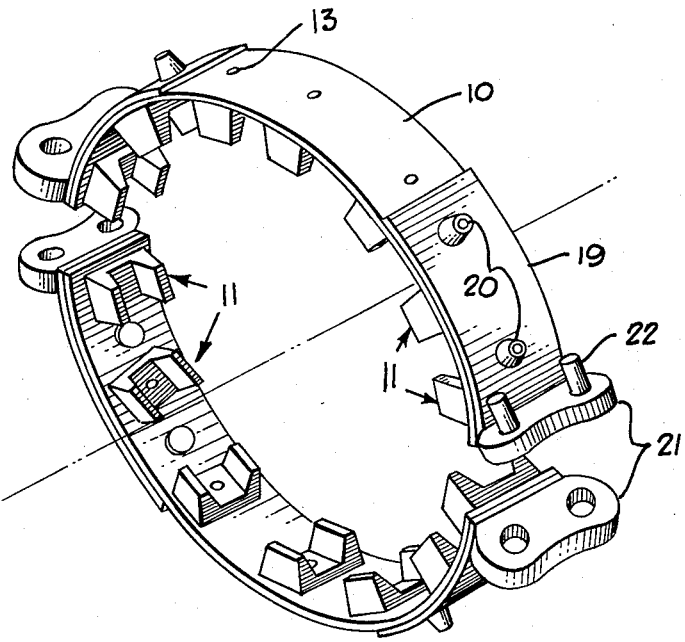
FIGURE 1 is a perspective view of the improved coupling clamp of the present invention.

Referring now to the drawings, there is shown in FIGURE 1 a coupling clamp according to the present invention which is split apart into two sections of identical construction. A description of one section of the clamp will, therefore, suffice for both.

The clamp is formed of a tension band 10 which has attached to its inner periphery a plurality of generally designated V lugs 11. Each of the V lugs 11 is apertured, as at 12, in FIGURE 2, so that it may be riveted or pinned at 13 to the band 10.

Figure 2:
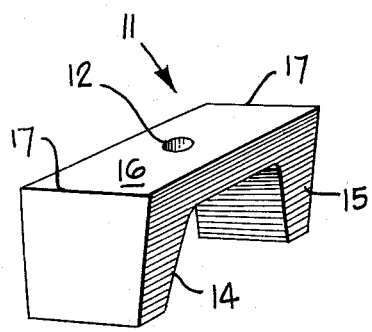
FIGURE 2 is an enlarged perspective view of one of the V lugs shown in FIGURE 1; and, FIGURE 3 is a partial sectional view of the clamp of FIGURE 1 embodied in a tube coupling assembly.

Each of the V lugs 11 further defines a wedge shaped cavity formed by the opposing legs 14 and 15 and a base portion 16 thereof, as more clearly shown in the view of FIGURE 2. The uppermost corners 17 of the V lug 11 are preferably sharply or squarely formed such that the possibility of bending or deformation of the lugs at these points is materially decreased.

In order that each of the lugs 11 may be self-aligning, it is important that the lugs 11 be coupled to the band 10 such that the lugs have a certain freedom of rotation relative to the band. Towards this end, the upper surface of the base 16 of the lug is desirably spaced a short distance $s$ from the bottom surface of the band, as is more clearly shown in the view of FIGURE 3. In the alternative, the apertures 12 may be made slightly elliptical thereby enabling a certain freedom of rotative movement of the lug 11 with respect to the band 10.

It will be appreciated that the lugs 11 provide many advantages over the conventional V clamp construction. In this regard, the lugs 11 may be used with any diameter tubing so long as they are attached to a band of proper diameter. In addition, as contrasting present day constructions, the lugs 11 may be formed from investment castings on a high production basis. Furthermore, by angular spacing of the lugs, at approximately 22½° apart, it will be appreciated that less material is required with a consequent savings in weight. It will further be noted that since the lugs 11 actually form the structural members for coupling the joint, that the tension band 10 may be of relatively thin material to obtain maximum hoop tension rather than using this member for structural rigidity.

For purposes of coupling the tube sections of the band clamp 10 together, straps 19 are riveted as at 20 to the respective ends thereof. The straps 19 are provided at their outer ends with connecting means or screw receiving means in the form of dual nuts 21. The nuts 21 may be designed to receive any type of bolt or Allen screw 22 as indicated.

By using a dual screw and nut construction added safety is obtained, each bolt having a sufficiently high tensile strength to hold the two sections of the clamp together under most application requirements.

Figure 3:
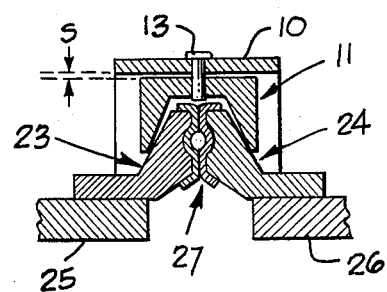

The manner in which the clamp of the present invention is employed may be readily seen from FIGURE 3, wherein the band 10 and coupled lugs 11 are disposed over opposing tube flanges 23 and 24, the latter being attached, respectively, to tubular sections 25 and 26. Appropriate sealing means 27 are interposed, preferably between the face portions of the flanges 23 and 24 in accordance with applicant's above referred to application.

Although the coupling clamp of the present invention has been illustrated in a preferred embodiment, it will be appreciated that various alterations and modifications may be made without departing from the spirit and scope of the invention.

What is claimed is:

1. A clamp for coupling together a pair of opposing tube flanges, said clamp comprising: a first flat tension band curved in an arc sub-tending an angle slightly less than 180 degrees; a second flat tension band of similar shape to said first band; a plurality of circumferentially spaced substantially identically shaped V lugs individually coupled on the side opposite the V-shaped opening by a pivotal means to the inner surface of said first band and said second band, said pivotal means which couples each of said lugs to said tension bands lying substantially in the same plane and fixed to said V lugs along a line equidistant from the ends of said V-shaped lugs, said V lugs being adapted to be wedged over said opposing tube flange; connecting means secured, respectively, to each end of said first band and said second band whereby respective ends of said first band and said second band may be circumferentially fastened together to in turn urge said V lugs over said opposing tube flanges, said pivotal means enabling relative rotative movement between said lugs and said first band and said second band, respectively, whereby said V lugs may be individually aligned with respect to said opposing tube flanges.

2. In a clamp for coupling together a pair of opposing tube flanges: a tension band member; a plurality of circumferentially spaced substantially identically shaped V lugs individually coupled on the side opposite the V shaped opening by a pivotal means to the inner surface of said tension band member, said pivotal means which couples each of said lugs to said tension bands lying substantially in the same plane and fixed to said V lugs along a line equidistant from the ends of said V-shaped lugs, said V lugs being adapted to be wedged over said opposing tube flanges and said pivotal means enabling relative rotative movement between said V lugs and said tension band, whereby said V lugs may be individually aligned with respect to said opposing tube flanges.

References Cited in the file of this patent

UNITED STATES PATENTS

| | | |
|---|---|---|
| 2,219,161 | Jacobs | Oct. 22, 1940 |
| 2,479,580 | Marco | Aug. 23, 1949 |
| 2,773,709 | Smith | Dec. 11, 1956 |
| 2,788,993 | Oldham | Apr. 16, 1957 |
| 2,801,116 | Herman | July 30, 1957 |
| 2,842,385 | Webster et al. | July 8, 1958 |

FOREIGN PATENTS

| | | |
|---|---|---|
| 126,655 | Great Britain | May 22, 1919 |